(12) United States Patent
Thorell et al.

(10) Patent No.: US 7,796,499 B2
(45) Date of Patent: Sep. 14, 2010

(54) METHOD OF AND SYSTEM FOR VIDEO FAST UPDATE

(75) Inventors: Per Thorell, Lund (SE); Jan-Ove Johansson, Malmo (SE); Göran Roth, Malmo (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1813 days.

(21) Appl. No.: 10/841,020

(22) Filed: May 7, 2004

(65) Prior Publication Data

US 2005/0138529 A1   Jun. 23, 2005

Related U.S. Application Data

(60) Provisional application No. 60/527,733, filed on Dec. 5, 2003.

(51) Int. Cl.
*H04J 3/14* (2006.01)
*H04L 12/26* (2006.01)
*G06F 11/00* (2006.01)
*H03M 13/00* (2006.01)

(52) U.S. Cl. .................. 370/216; 370/242; 370/395.2; 714/704; 714/774; 714/776

(58) Field of Classification Search ................ 370/216, 370/242, 395.2
See application file for complete search history.

(56) References Cited

U.S. PATENT DOCUMENTS

| | | | |
|---|---|---|---|
| 4,837,618 A | | 6/1989 | Hatori et al. |
| 5,390,188 A | * | 2/1995 | Dawson ..................... 714/717 |
| 5,432,787 A | * | 7/1995 | Chethik ...................... 370/473 |
| 5,513,185 A | * | 4/1996 | Schmidt ..................... 714/708 |
| 5,600,663 A | | 2/1997 | Ayanoglu et al. |
| 5,699,365 A | | 12/1997 | Klayman et al. |
| 5,764,651 A | * | 6/1998 | Bullock et al. .............. 714/708 |
| 5,768,533 A | | 6/1998 | Ran |
| 5,805,228 A | * | 9/1998 | Proctor et al. ........... 375/240.22 |
| 5,896,496 A | * | 4/1999 | Suzuki ........................ 714/48 |
| 5,909,404 A | * | 6/1999 | Schwarz ...................... 365/201 |
| 6,098,179 A | * | 8/2000 | Harter, Jr. ...................... 714/4 |

(Continued)

FOREIGN PATENT DOCUMENTS

EP    1202487    5/2002

(Continued)

OTHER PUBLICATIONS

JVT/H.26L Video Transmission in 3G Wireless Environments; Thomas Stockhammer et al.; Institute for Communicatons Engineering; Munich University of Technology; Munich, Germany; 6 Pages.

(Continued)

*Primary Examiner*—Alpus H Hsu

(57) ABSTRACT

A method of determining whether to generate a video refresh request includes receiving a packet and performing at least one of determining whether the received packet contains an error and determining whether a packet prior to the received packet was lost. Responsive to a determination that the received packet contains an error, an error index is increased. Responsive to a determination that a packet prior to the received packet has been lost, the error index is increased. Responsive to a determination that the received packet does not contain an error and that a packet prior to the received packet has not been lost, the error index is decreased.

22 Claims, 2 Drawing Sheets

U.S. PATENT DOCUMENTS

| | | |
|---|---|---|
| 6,208,663 B1 | 3/2001 | Schramm et al. |
| 6,314,535 B1 | 11/2001 | Morris et al. |
| 6,477,669 B1 | 11/2002 | Agarwal et al. |
| 6,611,674 B1 | 8/2003 | Jokimies et al. |
| 6,625,776 B1 | 9/2003 | Wright et al. |
| 6,697,996 B2* | 2/2004 | Chethik ............... 714/804 |
| 6,826,157 B1* | 11/2004 | Davis et al. ............. 370/252 |
| 6,831,947 B2* | 12/2004 | Ribas Corbera ........ 375/240.03 |
| 6,978,412 B1* | 12/2005 | Reents et al. ............ 714/746 |
| 7,143,320 B2* | 11/2006 | Cavin ................. 714/704 |
| 7,154,951 B2* | 12/2006 | Wang ................ 375/240.12 |
| 2002/0004921 A1* | 1/2002 | Muranaka et al. .......... 714/704 |
| 2002/0021755 A1 | 2/2002 | Hourunranta |
| 2002/0024929 A1* | 2/2002 | Brueckner et al. .......... 370/222 |
| 2002/0041629 A1 | 4/2002 | Hannuksela |
| 2002/0152440 A1 | 10/2002 | Yona et al. |
| 2002/0159525 A1 | 10/2002 | Jeong |
| 2003/0012138 A1* | 1/2003 | Abdelilah et al. .......... 370/231 |
| 2003/0016754 A1 | 1/2003 | Gandhi et al. |
| 2003/0026343 A1 | 2/2003 | Kim et al. |
| 2003/0031128 A1 | 2/2003 | Kim et al. |
| 2003/0162495 A1* | 8/2003 | Yonemoto et al. ............ 455/7 |

FOREIGN PATENT DOCUMENTS

| | | |
|---|---|---|
| GB | 2347038 A | 8/2000 |
| JP | 2003169304 | 6/2003 |
| WO | WO 02/052859 | 7/2002 |
| WO | WO 02/071736 | 9/2002 |

OTHER PUBLICATIONS

Adaptive Source Rate Control for Real-Time Wireless Video Transmission; Hang Liu et al.; Video Processing and Telecommunications Laboratory, Department of Electrical Engineering, University of Pennsylvania; pp. 49-60.

Influence of Encoder Parameters on the Decoded Video Quality for MPEG-4 Over W-CDMA Mobile Networks; Luis Ducla Soares et al.; 5 Pages.

Robust and Efficient Scalable Video Coding with Leaky Prediction; Sangeun Han et al.; Information Systems Laboratory, Stanford University, Stanford, CA; 4 Pages.

Feedback-Based Error Control for Mobile Video Transmission; Bernd Girod et al.; Proceedings of the IEEE, vol. 87, No. 10, Oct. 1999; pp. 1707-1723.

Tom Geary; "Multiplexing Protocol for Low Bitrate Multimedia Communication Over Low Error-Prone Channels—H.223—Annex A"; ITU-T Telecommunication Standardization Sector of ITU; Sep. 11, 1997; pp. 1-5.

Tom Geary; "Multiplexing Protocol for Low Bitrate Multimedia Communication Over Moderate Error-Prone Channels—H.223—Annex B"; ITU-T Telecommunication Standardization Sector of ITU; Sep. 1997; pp. 1-7.

Tom Geary; "Multiplexing Protocol for Low Bitrate Multimedia Communication Over Highly Error-Prone Channels—H.223—Annex C"; ITU-T Telecommunication Standardization Sector of ITU; Sep. 11, 1997; pp. 4-25.

Tom Geary; "ITU-T Draft Recommendation H.223/Annex D—Optional Multiplexing Protocol for Low Bit Rate Mobile Multimedia Communication Over Highly Error-Prone Channels"; ITU-T Telecommunication Standardization Sector of ITU; May 1999; pp. 1-11.

Qu et al. "Robust H.264 Video Coding and Transmission Over Bursty Packet-Loss Wireless Networks"; Vehicular Technology Conference; Fall 2003 IEEE 58th Orlando, FL Oct. 6-9, 2003; pp. 3395-3399.

Yuko Onoe and Hideyuki Tokuda, Media Scaling Applied to Multicast Communications, Computer Communications, Apr. 29, 1998, pp. 1226-1243; Japan.

* cited by examiner

METHOD OF AND SYSTEM FOR VIDEO FAST UPDATE

CROSS-REFERENCE TO RELATED APPLICATIONS

This patent application claims priority from, and incorporates by reference the entire disclosure of, U.S. Provisional Patent Application No. 60/527,733, which was filed on Dec. 5, 2003.

BACKGROUND OF THE INVENTION

1. Technical Field

The present invention relates generally to performing updates of video frames in response to received bit errors and, more particularly, but not by way of limitation, to performing video fast updates in video telephony services in Third Generation networks.

2. History of Related Art

An important application used in Third Generation ("3G") networks is Video Telephony services ("VT"). VT typically uses a transparent 64 kb/s bearer with an average bit error rate of approximately $10^{-4}$-$10^{-3}$. A higher bit error rate means that a wireless network can handle more simultaneous VT calls; however, a higher bit error rate often causes video-transmission problems.

An encoded video bit stream is very sensitive to errors. The error sensitivity of the video bit stream is primarily due to heavy use of prediction from previous video frames and the use of Variable Length Coding, which can easily get out of synchronization if a bit error is introduced into the bit stream. Many mobile terminals include video decoders that employ error concealment functionality to hide the effects of corrupted bit streams. The video encoders are typically also configured to produce resilient bit streams that are fairly robust to errors.

In cases when there are too many errors in the bit stream, error concealment employed by the mobile terminal may not be sufficient to effectively conceal the errors. The video decoder can then inform the video encoder to refresh the image by encoding a video frame without prediction from previous images. A video frame without prediction is referred to as an intra frame and is much larger than a typical frame; therefore, intra frames should not be sent unnecessarily. The video decoder informs the video encoder to refresh the image by sending a Video Fast Update ("VFU") message in accordance with the H.245 protocol to the video encoder.

Some mobile terminals send VFU requests at regular time intervals, meaning that complete intra frames are sometimes transferred even though no bit error has occurred. As a result, regular image freezes often occur in the received video, since intra frames take significantly longer to transmit than frames that utilize prediction, which are referred to as inter frames.

Other mobile terminals send VFU requests responsive to detection of a bit stream error. The VFU requests may be sent either by an H.223 demultiplexer or by an H.263/MPEG-4 video decoder of the mobile terminal. In this approach, an intra frame request is sent even when the detected error is so small that the error could be readily handled by the error concealment functionality of the video decoder. Thus, intra frames are sometimes unnecessarily transmitted.

Another solution, for updates of only parts of the image, is described in H.263 Appendix I. The solution described in H.263 Appendix I requires substantial changes in both the video encoder and updates to the Third Generation Partnership Project ("3GPP") recommendations for video telephony.

SUMMARY OF THE INVENTION

A method of determining whether to generate a video refresh request includes receiving a packet and performing at least one of determining whether the received packet contains an error and determining whether a packet prior to the received packet was lost. Responsive to a determination that the received packet contains an error, an error index is increased. Responsive to a determination that a packet prior to the received packet has been lost, the error index is increased. Responsive to a determination that the received packet does not contain an error and that a packet prior to the received packet has not been lost, the error index is decreased.

A system for determining whether to generate a video refresh request includes a plurality of registers for storing at least an error index and a packet information unit for obtaining packet-error information from an incoming bit stream. The system also includes a processor. The processor is interoperably connected to the packet information unit and the plurality of registers. The processor is for determining whether a received packet contains an error, determining whether a packet prior to the received packet was lost, responsive to a determination that the received packet contains an error, increasing the error index, responsive to a determination that a packet prior to the received packet has been lost, increasing the error index, and responsive to a determination that the received packet does not contain an error and that a packet prior to the received packet has not been lost, decreasing the error index.

BRIEF DESCRIPTION OF THE DRAWINGS

A more complete understanding of the present invention may be obtained by reference to the following Detailed Description of Exemplary Embodiments of the Invention, when taken in conjunction with the accompanying Drawings, wherein.

DETAILED DESCRIPTION OF EXEMPLARY EMBODIMENTS OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

According to the 3GPP recommendation 3G TS 26.911 V3.2.0, H.263 encoders in mobile terminals operating in accordance with 3G-324M should respond to all VFU commands received via H.245 control. The 3G TS 26.911 V3.2.0 recommendation states that "3G-324M decoders are correspondingly recommended to transmit Video Fast Update commands when the received picture is detected to be significantly corrupted due to transmission errors."

Because a VFU request should not be made unless the received image is significantly corrupted, a small number of errors in the bit stream should be considered acceptable. Error concealment by the video decoder, together with a cyclic intra refresh of image macro blocks, may be used to handle these errors. A VFU request is sent if there are many errors in a short amount of time. A leaky bucket type of algorithm may be used to determine if a VFU request needs to be sent responsive to detection of bit errors or missing data. In the leaky bucket type of algorithm, receipt of bad packets (i.e., packets with errors or missing packets) increases an Error Index ("EI") that is used in connection with an Error Index Threshold ("EIT") to determine when to send a VFU request. An Error Index Delta ("EID") is analogous to a hole in the bucket, in that receipt of good packets (i.e., in-sequence packets without errors) causes the EI to decrease and thereby become further from the EIT.

Figure 1:
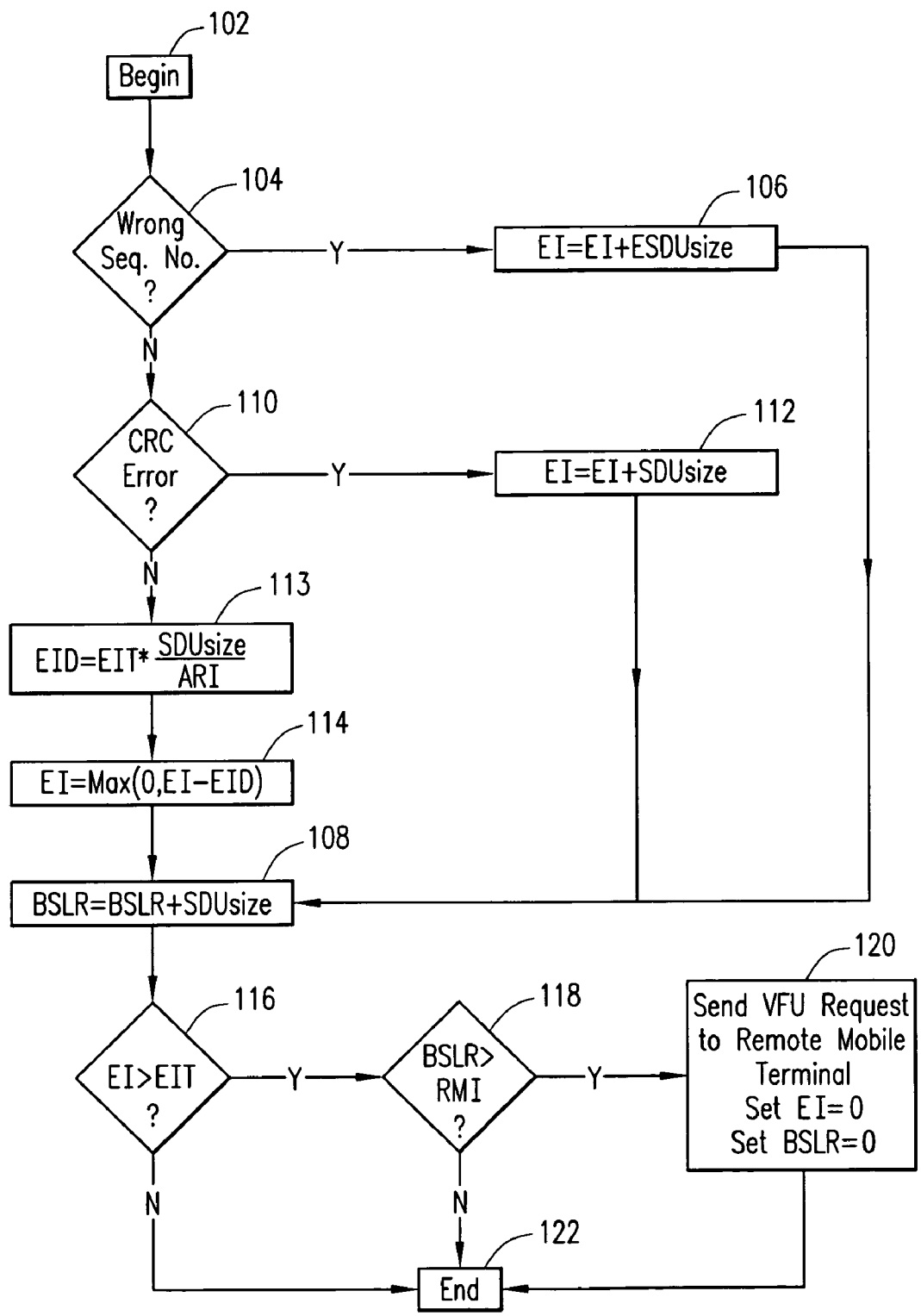
FIG. 1 is a flow chart that illustrates an algorithm for determining when a mobile terminal should generate a VFU request.

Referring now to the FIGURES, FIG. 1 is a flow chart that illustrates an algorithm for determining when a mobile terminal should generate a VFU request. Various variables and constants are used by a flow 100, which begins at step 102. In FIG. 1, EI is a variable that reflects a current bit error rate. EI may be viewed as a representation of an accumulated number of video bytes with an incorrect cyclical redundancy check ("CRC") or that have been missing (i.e., received out of sequence) since a most recent VFU request compensated for a cyclic intra refresh that automatically updates the image. Corrupt or missing video H.223 AL-SDUs, which are a type of video transport packet, cause the EI to increase in proportion to the size of the corrupt or missing video transport packets. If the EI becomes greater than a predetermined threshold, a VFU request is generated. The EI is decreased at regular time intervals or for each correct video transport packet that is received. Decreasing the EI in this manner compensates for a cyclic intra refresh that automatically updates the image after an error in the bit stream.

Bytes Since Last Refresh ("BSLR") is a variable that reflects a number of bytes that have passed in the video bit stream since the most recent VFU request. The EIT is a predefined constant that reflects a number of corrupt bytes that will lead to an immediate VFU request. In various embodiments of the invention, a typical BSLR value is 400. Estimated Service Data Unit size ("ESDUsize") is a variable that represents an estimated size of a missing video transport packet due to an error. SDU size ("SDUsize") is a variable that represents a size of a video transport packet that has a CRC error.

Auto Refresh Interval ("ARI") is a constant that reflects how quickly small errors are forgotten. ARI may be set, for example, to the number of bytes before the image is completely refreshed by cyclic intra refresh. In various embodiments of the invention, a typical ARI value is 13,000 (5 Intra blocks out of 99 total in each frame, 10 fps, 6,500 byte/s=>1.98 s or approximately 13,000 bytes to complete cyclic refresh). EID is a variable that reflects how much EI should be decremented after a correct packet has been received. EID may be set to (SDUsize/ARI)*EIT. Refresh Minimum Interval ("RMI") is a constant that reflects the minimal number of bytes that must be received before a VFU request may be sent.

Referring again to FIG. 1, from step 102, execution proceeds to step 104, at which step a determination is made whether a received video transport packet has a wrong sequence number. If, at step 104, it is determined that the received video transport packet has a wrong sequence number, execution proceeds to step 106.

At step 106, the EI is incremented by adding the ESDUsize. ESDUsize is, of course, an estimate of the size of a missing video transport packet. From step 106, execution proceeds to step 108. At step 108, BSLR is incremented by adding SDUsize. If, at step 104, the received video transport packet is not determined to have a wrong sequence number, execution proceeds to step 110. At step 110, a determination is made whether a CRC error is present. If, at step 110, it is determined that a CRC error is present in the received video transport packet, execution proceeds to step 112. At step 112, EI is incremented by the SDUsize. From step 112, execution proceeds to step 108.

If, at step 110, it is not determined that a CRC error is present in the received video transport packet, execution proceeds to step 113. At step 113, EID is calculated. As noted above, EID may be set to (SDUsize/ARI)*EIT. From step 113, execution proceeds to step 114. At step 114, EI is decremented by the EID and EI is set to max (0, EI−EID) in order to avoid EI taking a negative value. Step 114 represents a figurative hole in the bucket of the leaky bucket type algorithm 100. From step 114, execution proceeds to step 108.

From step 108, execution proceeds to step 116. At step 116, a determination is made whether EI is greater than the EIT. If it is so determined at step 116, execution proceeds to step 118. At step 118, determination is made whether BSLR is greater than RMI. If it is so determined at step 118, execution proceeds to step 120. At step 120, a VFU request is sent to a remote mobile terminal, EI is set to zero, and BSLR is set to zero. From step 120, execution proceeds to step 122, at which step execution ends. If, at step 116, it is not determined that EI is greater than EIT, execution proceeds to step 122. If, at step 118, it is not determined that BSLR is greater than RMI, execution proceeds to step 122.

An intra block refresh rate of a sending mobile terminal varies according to the video encoder used; therefore, the values of ARI and EID may be selected to reflect the refresh rate of a video encoder in the sending mobile terminal. In relatively simple embodiments of the invention, a fixed value of EID may be assumed. In more complex embodiments of the invention, an actual ARI value may be calculated using incoming video bit stream data. Following calculation of the ARI value, the ARI value may be transmitted from a video decoder to a VFU module of the mobile terminal. An EID value may then be calculated from a current ARI value.

Figure 2:
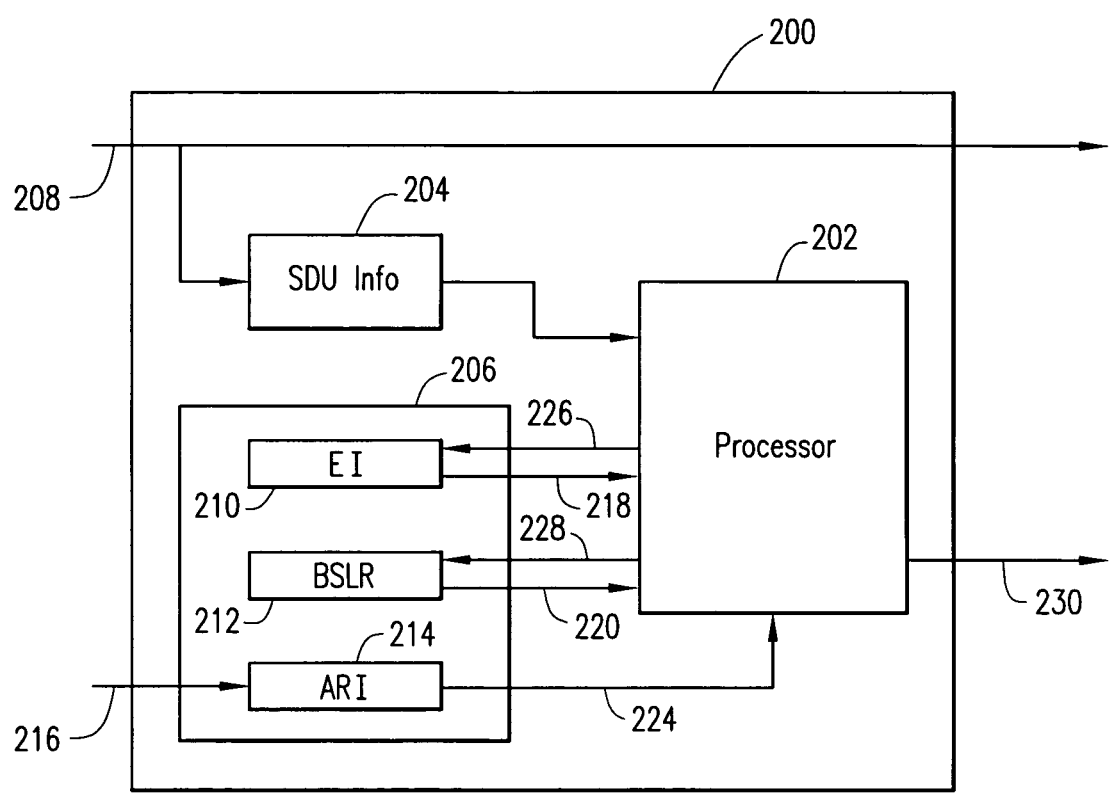
FIG. 2 is a block diagram of an exemplary VFU module of a mobile terminal.

Referring again to the FIGURES, FIG. 2 is a block diagram of an exemplary VFU module of a mobile terminal. A VFU module 200 includes a processing unit 202, an SDU information unit 204, and a register bank 206. The SDU information unit 204 receives video transport packets from an H.223 multiplexer (not explicitly shown) of the mobile terminal via a line 208. Video transport packets received by the SDU information unit 204 via the line 208 are also input to a video decoder (not explicitly shown) of the mobile terminal. The SDU information unit 204 extracts information from video transport packets received on the line 208 such as, for example, CRC error flags, sequence numbers, and information regarding the size of received video transport packets.

The register bank 206 includes an EI register 210, a BSLR register 212, and an ARI register 214. It will be understood by those having ordinary skill in the art that the ARI register 214 is not necessary when a value of EID is fixed in advance. In contrast, in embodiments of the invention in which the EID value is calculated, the EID value is calculated from the ARI value received by the ARI register 214 via a line 216. The line 216 inputs intra block refresh rate statistics from a video decoder (not explicitly shown) of the mobile terminal. Each of the EI register 210, the BSLR register 212, and the ARI register 214 may input data to the processor 202 via lines 218, 220, and 224, respectively. The EI register 210 and the BSLR register 212 may each be written to by the processor 204 via lines 226 and 228, respectively. The processor 202 outputs a VFU request to a video encoder (not explicitly shown) of the mobile terminal via a line 230.

The VFU module 200 may be utilized to implement the flow 100 or any other suitable leaky bucket algorithm for determining when a VFU request should be made. Those having ordinary skill in the art will appreciate that modifications may be made to the flow 100 and the VFU module 200 without departing from principles of the invention.

Instead of counting bytes in the video bit stream and storing the number in a BSLR register, a total number of bytes on an incoming multiplexed bit stream (e.g., including audio, video and control) since a most recent VFU request may be counted and the time since the last VFU request measured. Further, instead of counting only errors in the video bit stream, all detectable errors in the incoming multiplexed bit stream may be counted. Principles of the invention may be applied, for example, to a H.223 multiplexer module or to the H.263/MPEG-4/H.264 video decoder module of a mobile terminal. In various embodiments of the invention, transport protocols other than H.223 may be used for sending the video data. For example, principles of the invention may be applied to an H.323 or session initiation protocol (SIP) based system that uses the real time protocol (RTP) for data transport.

The previous Detailed Description is of embodiment(s) of the invention. The scope of the invention should not necessarily be limited by this Description. The scope of the invention is instead defined by the following claims and the equivalents thereof.

What is claimed is:

1. A method of determining whether to generate a video refresh request, the method comprising:
   receiving a packet;
   performing at least one of the steps of:
      determining whether the received packet contains an error; and
      determining whether a packet prior to the received packet was lost;
      if the step of determining whether the received packet contains an error was performed, and if responsive thereto, there is a determination that the received packet contains an error, increasing an error index;
      if the step of determining whether a packet prior to the received packet was lost was performed, and if responsive thereto, there is a determination that a packet prior to the received packet has been lost, increasing the error index;
      if the step of determining whether the received packet contains an error was performed, and if responsive thereto, there is a determination that the received packet does not contain an error, decreasing the error index by a value proportional to a size of the received packet; and
      if the step of determining whether a packet prior to the received packet was lost was performed, and if responsive thereto, there is a determination that a packet prior to the received packet has not been lost, decreasing the error index by a value proportional to a size of the received packet.

2. The method of claim 1, wherein the step of determining whether a packet prior to the received packet was lost comprises analyzing a header of the received packet.

3. The method of claim 1, wherein the step of determining whether the received packet contains an error comprises analyzing a CRC checksum of the received packet.

4. The method of claim 1, wherein the received packet is a video transport packet.

5. The method of claim 4, wherein the received packet is an R.223 Adaptation Layer Service Data Unit (AL-SDU).

6. The method of claim 4, wherein the received packet is an RTP packet.

7. The method of claim 1, further comprising:
   determining that the error index exceeds a pre-determined error index threshold; and
   requesting a video refresh.

8. The method of claim 1, further comprising:
   generating a video refresh request responsive to:
      a determination that the error index has exceeded a pre-determined error index threshold; and
      a determination that a quantity of data received since a most recent video refresh request exceeds a pre-determined data-quantity threshold.

9. The method of claim 8, further comprising comparing the error index to the pre-determined error index threshold.

10. The method of claim 1, wherein the step of determining whether the received packet contains an error comprises determining whether the received packet has a valid CRC.

11. The method of claim 1, wherein the step of decreasing the error index comprises decreasing the error index by a value proportional to an intra block refresh rate.

12. A system for determining whether to generate a video refresh request, the system
   comprising:
      a plurality of registers for storing at least an error index;
      a packet information unit for obtaining packet-error information from an incoming bit stream;
      a processor, inter-operably connected to the packet information unit and the plurality of registers, the processor configured to:
      determine whether a received packet contains an error; and
      determine whether a packet prior to the received packet was lost;
      the processor further configured to:
      responsive to a determination that the received packet contains an error, increase the error index;
      responsive to a determination that a packet prior to the received packet has been lost, increase the error index;
      the processor further configured to:
      responsive to a determination that the received packet does not contain an error decrease the error index by a value proportional to a size of the received packet; and
      responsive to a determination that a packet prior to the received packet has not been lost, decrease the error index by a value proportional to a size of the received packet.

13. The system of claim 12, wherein determining whether a packet prior to the received packet was lost comprises analyzing a header of the received packet.

14. The system of claim 12, wherein determining whether the received packet contains an error comprises analyzing a CRC checksum of the received packet.

15. The system of claim 12, wherein the received packet is a video transport packet.

16. The system of claim 15, wherein the received packet is an H.223 Adaptation Layer Service Data Unit (AI-SOU).

17. The system of claim 15, wherein the received packet is an RTP packet.

18. The system of claim 12, wherein the processor is further for:
   determining that the error index exceeds a pre-determined error index threshold; and
   requesting a video refresh.

19. The system of claim 12, wherein the processor is further for generating a video refresh request responsive to:

a determination that the error index has exceeded a pre-determined error index threshold; and a determination that a quantity of data received since a most recent video refresh request exceeds a pre-determined data-quantity threshold.

20. The system of claim 19, wherein the processor is further for comparing the error index to the pre-determined error index threshold.

21. The system of claim 12, wherein determining whether the received packet contains an error comprises determining whether the received packet has a valid CRC.

22. The system of claim 12, wherein decreasing the error index comprises decreasing the error index by a value proportional to an intra block refresh rate.

* * * * *

UNITED STATES PATENT AND TRADEMARK OFFICE
CERTIFICATE OF CORRECTION

| | | |
|---|---|---|
| PATENT NO. | : 7,796,499 B2 | Page 1 of 1 |
| APPLICATION NO. | : 10/841020 | |
| DATED | : September 14, 2010 | |
| INVENTOR(S) | : Thorell et al. | |

It is certified that error appears in the above-identified patent and that said Letters Patent is hereby corrected as shown below:

In Column 5, Line 67, in Claim 5, delete "R.223" and insert -- H.223 --, therefor.

In Column 6, Line 58, in Claim 16, delete "(AI-SOU)." and insert -- (AL-SDU). --, therefor.

Signed and Sealed this
First Day of February, 2011

David J. Kappos
*Director of the United States Patent and Trademark Office*